(12) United States Patent
Zhang et al.

(10) Patent No.: US 11,807,281 B2
(45) Date of Patent: Nov. 7, 2023

(54) CAB ROOF STRUCTURE, CAB AND RAIL TRAIN

(71) Applicant: CRRC Qingdao Sifang Co., Ltd., Shandong (CN)

(72) Inventors: Ye Zhang, Shandong (CN); Keming Shang, Shandong (CN); Honglei Tian, Shandong (CN); Xin Jiang, Shandong (CN); Xiao Dong, Shandong (CN)

(73) Assignee: CRRC Qingdao Sifang Co., Ltd., Shandong (CN)

( * ) Notice: Subject to any disclaimer, the term of this patent is extended or adjusted under 35 U.S.C. 154(b) by 415 days.

(21) Appl. No.: 17/260,502

(22) PCT Filed: Sep. 10, 2019

(86) PCT No.: PCT/CN2019/105039
§ 371 (c)(1),
(2) Date: Jan. 14, 2021

(87) PCT Pub. No.: WO2020/211269
PCT Pub. Date: Oct. 22, 2020

(65) Prior Publication Data
US 2021/0300443 A1    Sep. 30, 2021

(30) Foreign Application Priority Data

Apr. 17, 2019 (CN) .......................... 201910306942.5

(51) Int. Cl.
*B61D 17/12* (2006.01)
*B61D 7/12* (2006.01)
(52) U.S. Cl.
CPC ..................................... *B61D 7/12* (2013.01)

(58) Field of Classification Search
CPC ...... B61D 17/12; B61D 17/10; B61D 17/045; B62D 25/06
See application file for complete search history.

(56) References Cited

U.S. PATENT DOCUMENTS 3,237,573 A * 3/1966 Dean ...................... B61D 17/12
105/397
3,420,192 A * 1/1969 Ellis ................... B62D 25/2054
105/422

(Continued)

FOREIGN PATENT DOCUMENTS

CN    210610138    10/2010
CN    104475997    4/2015
(Continued)

OTHER PUBLICATIONS

International Search Report and Written Opinion dated Jan. 22, 2020 for international application PCT/CN2019/105039.

(Continued)

*Primary Examiner* — Mark T Le
(74) *Attorney, Agent, or Firm* — Stoel Rives LLP (57) ABSTRACT

A cab roof structure, a cab and a rail train are described. The cab roof structure comprises: at least one roof connecting beam disposed on a roof carline; and at least two aluminum honeycomb panels, one roof connecting beam is disposed between every two aluminum honeycomb panels, and each aluminum honeycomb panel is fixedly connected to a left or right side of the roof connecting beam. The cab roof structure has the advantages of high structural strength, light weight, less welding and good manufacturability.

19 Claims, 3 Drawing Sheets

(56) References Cited

U.S. PATENT DOCUMENTS

| | | | | |
|---|---|---|---|---|
| 5,199,632 A * | 4/1993 | Takeichi | ............. | B61D 17/043 |
| | | | | 228/187 |
| 5,287,814 A * | 2/1994 | Masai | .................. | B61D 17/041 |
| | | | | 105/418 |
| 5,595,123 A * | 1/1997 | Tao | ...................... | B61D 17/045 |
| | | | | 105/396 |
| 2015/0059614 A1 * | 3/2015 | Matsumoto | ............. | B61C 17/04 |
| | | | | 105/456 |

FOREIGN PATENT DOCUMENTS

| | | |
|---|---|---|
| CN | 205292646 | 6/2016 |
| CN | 107499323 | 12/2017 |
| CN | 207106656 | 3/2018 |
| CN | 109050552 | 12/2018 |
| CN | 208585241 | 3/2019 |
| CN | 110027577 | 7/2019 |
| CN | 110027578 | 7/2019 |
| EP | 0756979 A1 | 2/1997 |
| EP | 3932771 A1 | 1/2022 |
| JP | 09122911 | 5/1997 |

OTHER PUBLICATIONS

Extended European Search Report for EP Application 19925182 dated Mar. 14, 2022. pp. 1-6.

* cited by examiner

CAB ROOF STRUCTURE, CAB AND RAIL TRAIN

CROSS-REFERENCE TO RELATED APPLICATION

The present application is a national stage filing under 35 U.S.C. § 371 of International Patent Application No. PCT/CN2019/105039, filed Sep. 10, 2019, which claims priority to Chinese Application No. 2019103069425 filed on Apr. 17, 2019, entitled "Cab Roof Structure, Cab and Rail Train", each of which is hereby incorporated by reference in its entirety.

FIELD OF TECHNOLOGY

The present disclosure relates to the technical field of a rail train, in particular to a cab roof structure, a cab and a rail train.

BACKGROUND

Traditional rail vehicles usually have aluminum alloy bodies, and the design of the entire vehicle has higher requirements for weight reduction. Since the roof structure of traditional aluminum alloy cab is usually a hybrid structure of plate-girders and aluminum plates, more plate-girders are needed so as to enhance structural strength and support strength. However, more plate-girders will increase the weight of the cab. On the other hand, more plate-girders will result in large welding amounts, higher requirements for manufacturability, and more complicated construction.

BRIEF SUMMARY

(I) Technical Problems to be Solved

It is an object of the present disclosure to provide a cab roof structure, a cab and a rail train, so as to solve the technical problems of heavy weight, large welding amounts and complicated process of the cab roof in the prior art.

(II) Technical Solutions

In order to solve the technical problems above, according to a first aspect of the present disclosure, it is provided a cab roof structure, including: at least one roof connecting beam disposed on a roof carline; and at least two aluminum honeycomb panels, one roof connecting beam is disposed between every two aluminum honeycomb panels, and each aluminum honeycomb panel is fixedly connected to a left or right side of the roof connecting beam.

In an embodiment, the aluminum honeycomb panel disposed on a left side of the roof connecting beam is referred to as a first aluminum honeycomb panel, and the aluminum honeycomb panel disposed on a right side of the roof connecting beam is referred to as a second aluminum honeycomb panel; a first protrusion is provided on an upper surface of the roof connecting beam, and a first shoulder configured to bear the first aluminum honeycomb panel and a second shoulder configured to bear the second aluminum honeycomb panel are respectively provided on left and right sides of the first protrusion.

In an embodiment, an upper end surface of the first shoulder is flush with an upper end surface of the second shoulder.

In an embodiment, a second protrusion is provided on an upper end surface of the first protrusion, and a third shoulder configured to connect an upper panel of the first aluminum honeycomb panel and a fourth shoulder configured to connect an upper panel of the second aluminum honeycomb panel are respectively provided on left and right sides of the second protrusion.

In an embodiment, an upper end surface of the third shoulder is flush with an upper end surface of the fourth shoulder.

In an embodiment, a first welding position configured to weld one end of the upper panel of the first aluminum honeycomb panel onto the third shoulder is provided on the third shoulder.

In an embodiment, the third shoulder includes a first horizontal portion and a first inclined portion connected to the first horizontal portion, wherein a first included angle is formed between the first horizontal portion and the first inclined portion.

In an embodiment, the first horizontal portion is disposed above the first shoulder, and a horizontal plane on which the first horizontal portion is located is disposed in parallel with the upper end surface of the first shoulder.

In an embodiment, a second welding position configured to weld one end of the upper panel of the second aluminum honeycomb panel onto the fourth shoulder is provided on the fourth shoulder.

In an embodiment, the fourth shoulder includes a second horizontal portion and a second inclined portion connected to the second horizontal portion, wherein a second included angle is formed between the second horizontal portion and the second inclined portion.

In an embodiment, a first fillet welding position is provided at a portion of the first shoulder in contact with a lower panel of the first aluminum honeycomb panel; a second fillet welding position is provided at a portion of the second shoulder in contact with a lower panel of the second aluminum honeycomb panel.

In an embodiment, the cab roof structure further includes reinforcing beams respectively disposed between two adjacent roof connecting beams, and the reinforcing beams are multiple and disposed at intervals along an extending directions of the roof connecting beams.

In an embodiment, the cab roof structure further includes a roof rear end panel disposed at a rear end of the roof carline, wherein a first end of the roof connecting beam is connected to the roof carline, and a second end of the roof connecting beam is connected to the roof rear end panel.

In an embodiment, a support member extending in a direction away from the roof rear end panel is provided on a surface of the roof rear end panel towards a head.

In an embodiment, a horizontal mounting position is provided on an upper end surface of the roof rear end panel, and an aluminum liner panel is disposed on the horizontal mounting position.

In an embodiment, upper panels of each of the aluminum honeycomb panels proximate to the roof rear end panel are welded to an upper end surface of the aluminum liner panel.

According to a second aspect of the present disclosure, it is further provided a cab including the cab roof structure mentioned above.

According to a third aspect of the present disclosure, it is further provided a rail train including the cab mentioned above.

(III) Beneficial Effects

Compared with the prior art, the cab roof structure according to the present disclosure has the following advantages:

Due to the high structural strength and excellent rigidity of the aluminum honeycomb panels, applying the aluminum honeycomb panels to the cab roof can help reduce the number of plates and beams to some extent, such that the weight of the cab roof is reduced, and the cab roof has the advantages of light weight and good manufacturability.

In addition, due to the addition of aluminum honeycomb panels, the structural strength of the cab roof is effectively enhanced, thus the number of plates and beams can be appropriately decreased. With the decrease in the number of plates and beams, the welding amounts are greatly reduced, thereby effectively simplifying the manufacturing difficulty, reducing the complexity of the manufacturing process, and improving the production efficiency of the cab roof.

| Reference Numerals: | |
|---|---|
| 1 roof carline | 2 roof connecting beam |
| 21 first protrusion | 22 first shoulder |
| 221 first fillet welding position | 23 second shoulder |
| 231 second fillet welding position | 24 second protrusion |
| 25 third shoulder | 251 first horizontal portion |
| 252 first inclined portion | 253 first groove |
| A first included angle | a included angle at the first groove |
| 26 fourth shoulder | 261 second horizontal portion |
| 262 second inclined portion | 263 second groove |
| B second included angle | b included angle at the second groove |
| 3 aluminum honeycomb panel | 31 first aluminum honeycomb panel |
| 32 second aluminum honeycomb panel | 4 reinforcing beam |
| 5 roof rear end panel | 6 support member |
| 7 aluminum liner panel | |

DETAILED DESCRIPTION

Specific embodiments of the present disclosure will be described in further detail below in conjunction with the drawings and embodiments. The following examples are intended to illustrate the present disclosure, rather than limiting the scope of the present disclosure.

In the description of the present disclosure, it should be noted that, unless otherwise clearly specified or defined, the terms "install", "connected with" and "connected to" should be understood in a broad sense, for example, it can be a fixed connection or a detachable connection, or an integral connection; it can be mechanically connected or electrically connected; it can be directly connected or indirectly connected through an intermediary and can be communication between interiors of two elements. For those of ordinary skill in the art, the specific meaning of the above terms in the present disclosure can be understood according to the specific situations.

As shown in FIGS. 1 to 5, it is schematically illustrated that a cab roof structure includes a roof carline 1, roof connecting beams 2 and at least two aluminum honeycomb panels 3.

Figure 1:
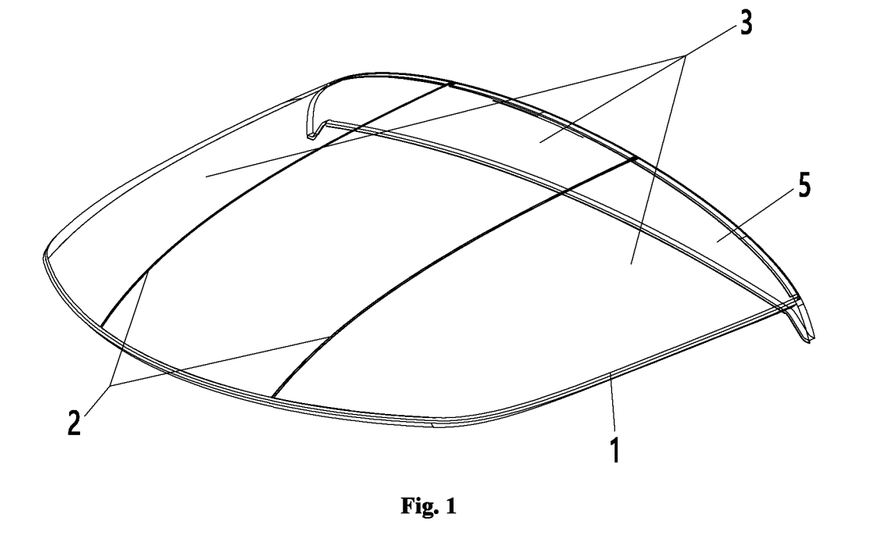
FIG. 1 is an overall structure diagram of a cab roof structure according to an embodiment of the present application.

In an embodiment of the present disclosure, there is at least one roof carline 1, and the roof connecting beam 2 is disposed on the roof carline 1.

One roof connecting beam 2 is disposed between every two aluminum honeycomb panels 3, and each aluminum honeycomb panel 3 is fixedly connected to a left or right side of the roof connecting beam 2.

It should be noted that the aluminum honeycomb panel 3 has a traditional structure that generally includes an upper panel, a lower panel, and a honeycomb core sandwiched between the upper panel and the lower panel.

Specifically, due to the high structural strength and rigidity of the aluminum honeycomb panels 3, applying the aluminum honeycomb panels 3 to the cab roof can help reduce the number of plates and beams to some extent, such that the weight of the cab roof is reduced, and thus the cab roof has the advantages of light weight and good manufacturability.

In addition, due to the addition of the aluminum honeycomb panels 3, the structural strength of the cab roof is effectively enhanced, thus the number of plates and beams can be appropriately decreased. With the decrease in the number of plates and beams, the welding amounts are greatly reduced, thereby effectively simplifying the manufacturing difficulty, reducing the complexity of the manufacturing process, and improving the production efficiency of the cab roof.

Figure 3:
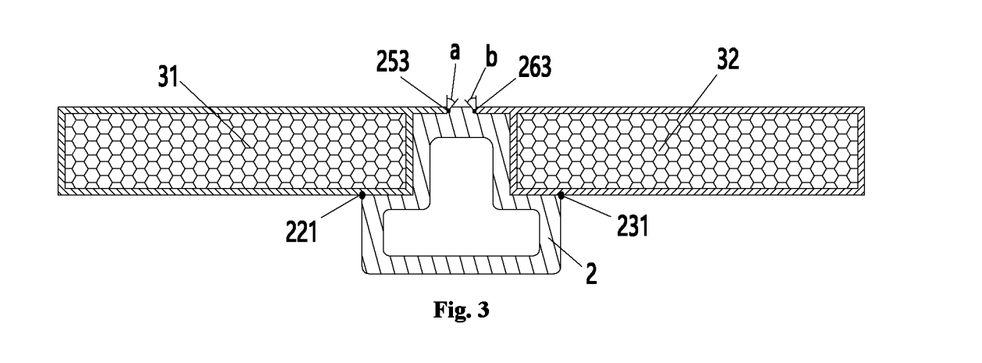
FIG. 3 is a connection structure diagram of the roof connecting beam respectively connected to first and second aluminum honeycomb panels in FIG. 1.
Figure 4:
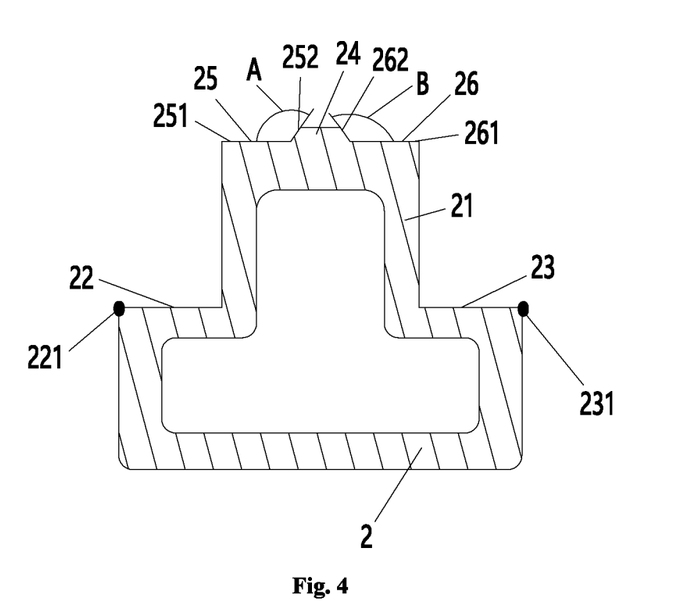
FIG. 4 is a cross-sectional structure diagram of the roof connecting beam in FIG. 1.

As shown in FIGS. 3 and 4, in a preferred embodiment of the present disclosure, the roof connecting beam 2 has a hollow interior. Therefore, since the interior of the roof connecting beam 2 is hollow, the weight of the cab roof can be effectively reduced while ensuring its structural strength, support strength as well as load-bearing strength, so that the cab roof can meet the needs of lightweight.

In the present embodiment, the cross-sectional shape of the roof connecting beam 2 is similar to a convex shape.

It should also be noted that the roof connecting beam 2 is preferably made of hollow profiles.

As shown in FIGS. 1 to 4, in a preferred embodiment of the present disclosure, the aluminum honeycomb panel 3 disposed on the left side of the roof connecting beam 2 is referred to as a first aluminum honeycomb panel 31, and the aluminum honeycomb panel 3 disposed on the right side of the roof connecting beam 2 is referred to as a second aluminum honeycomb panel 32; a first protrusion 21 is provided on an upper surface of the roof connecting beam 2, and a first shoulder 22 configured to bear the first aluminum honeycomb panel 31 and a second shoulder 23 configured to bear the second aluminum honeycomb panel 32 are respectively provided on left and right sides of the first protrusion 21. It should be noted that, due to the first shoulder 22, it is possible to provide a better support for the first aluminum honeycomb panel 31 as a whole, so that it can be effectively fixedly connected with the corresponding side of the roof connecting beam 2.

Similarly, due to the second shoulder 23, it is possible to provide a better support for the second aluminum honeycomb panel 32 as a whole, so that it can be effectively fixedly connected with the corresponding side of the roof connecting beam 2.

It should be noted that, the roof connecting beam 2, together with the first aluminum honeycomb panel 31 and the second aluminum honeycomb panel 32 respectively disposed on left and right sides of the roof connecting beam 2, constitute a basic splicing module of the cab roof. The specific number of basic splicing modules can be determined according to the area of the cab roof of various models of vehicles, that is, the number of the basic splicing modules can be one, two, three, or more than three.

In an embodiment of the present application, the roof carline 1 has a universal interface structure, which can be installed and disassembled as a separate module, and is therefore highly versatile.

In another preferred embodiment of the present disclosure, an upper end surface of the first shoulder 22 is flush with an upper end surface of the second shoulder 23. Specifically, when the first aluminum honeycomb panel 31 is lapped on the upper end surface of the first shoulder 22, and the second aluminum honeycomb panel 32 is lapped on the upper end surface of the second shoulder 23, it is ensured that the upper end surface of the upper panel of the first aluminum honeycomb panel 31 is flush with the upper end surface of the upper panel of the second aluminum honeycomb panel 32 by allowing the upper end surface of the first shoulder 22 to be flush with the upper end surface of the second shoulder 23. Therefore, it can also be ensured that the top surface of the cab roof structure can be connected smoothly, and height dislocation which affects the welding effect is avoided, thereby effectively ensuring the overall aesthetics of the cab roof structure.

As shown in FIGS. 3 and 4, in another preferred embodiment of the present disclosure, a second protrusion 24 is provided on an upper end surface of the first protrusion 21, and a third shoulder 25 configured to connect an upper panel of the first aluminum honeycomb panel 31 and a fourth shoulder 26 configured to connect an upper panel of the second aluminum honeycomb panel 32 are respectively provided on left and right sides of the second protrusion 24. It should be noted that the third shoulder 25 is configured to be lapped on the upper panel of the first aluminum honeycomb panel 31, and the fourth shoulder 26 is configured to be lapped on the second aluminum honeycomb panel 32. The upper end surface of the upper panel of the first aluminum honeycomb panel 31, the upper end surface of the second protrusion 24, and the upper end surface of the upper panel of the second aluminum honeycomb panel 32 are flush.

In another preferred embodiment, an upper end surface of the third shoulder 25 is flush with an upper end surface of the fourth shoulder 26. Therefore, the smoothness of connection of the cab roof and the overall aesthetics can be ensured.

In addition, since the first protrusion 21 and the second protrusion 24 are sequentially provided on the roof connecting beam 2 from bottom to top, the roof connecting beam 2 can be allowed to have double shoulders.

A roof connecting beam 2 with double shoulders is connected between every two aluminum honeycomb panels 3 (the first aluminum honeycomb panel 31 and the second aluminum honeycomb panel 32), groove welding is conducted at the upper panel of the aluminum honeycomb panel 3, and fillet welding is conducted at the lower panel of the aluminum honeycomb panel 3, and thus the strength of connection between adjacent aluminum honeycomb panels 3 can be effectively increased, thereby effectively improving the bearing capacity of the cab roof.

In addition, it should be noted that the problem of welding defects and deformation occurred after the first aluminum honeycomb panel 31 and the second aluminum honeycomb panel 32 are spliced is effectively solved by constructing the roof connecting beam 2 as a profile structure with double shoulders, thereby ensuring the reliability and aesthetics of the welding between the first aluminum honeycomb panel 31 and the second aluminum honeycomb panel 32.

As shown in FIGS. 3 and 4, in a preferred embodiment of the present disclosure, a first welding position configured to weld one end of the upper panel of the first aluminum honeycomb panel 31 onto the third shoulder 25 is provided on the third shoulder 25. Specifically, due to the first welding position, one end of the upper panel of the first aluminum honeycomb panel 31 can be lapped on the upper end surface of the third shoulder 25 and welded to the third shoulder 25 as a whole. Therefore, the first aluminum honeycomb panel 31 and the roof connecting beam 2 can be effectively connected. It is preferable that "welding method" is groove welding.

As shown in FIGS. 3 and 4, in a preferred embodiment of the present disclosure, the third shoulder 25 includes a first horizontal portion 251 and a first inclined portion 252 connected to the first horizontal portion 251, wherein a first included angle A is formed between the first horizontal portion 251 and the first inclined portion 252. In an embodiment, the range of the first included angle A may be 125 degrees to 145 degrees. After one end of the upper panel of the first aluminum honeycomb panel 31 is lapped on the first horizontal portion 251, a first groove 253 is formed between a side end surface of the upper panel toward the first inclined portion 252 and the first inclined portion 252. The included angle a at the first groove 253 is 35 degrees to 55 degrees.

In a preferred embodiment of the present disclosure, the first horizontal portion 251 is disposed above the first shoulder 22, and a horizontal plane on which the first horizontal portion 251 is located is disposed in parallel with the upper end surface of the first shoulder 22. Preferably, the horizontal plane on which the first horizontal portion 251 is located and the upper end surface of the first shoulder 22 are longitudinally staggered and disposed in parallel.

As shown in FIGS. 3 and 4, in order to further optimize the roof connecting beam 2 in the foregoing technical solution, on the basis of the technical solution above, a second welding position configured to weld one end of the upper panel of the second aluminum honeycomb panel 32 onto the fourth shoulder 26 is provided on the fourth shoulder 26. It should be noted that, due to the second welding position, one end of the upper panel of the second aluminum honeycomb panel 32 can be lapped on the upper end surface of the fourth shoulder 26 and welded to the fourth shoulder 26 as a whole. Therefore, the second aluminum honeycomb panel 32 and the roof connecting beam 2 can be effectively connected. It is preferable that the "welding method" is groove welding.

As shown in FIGS. 3 and 4, in another preferred embodiment of the present disclosure, the fourth shoulder 26 includes a second horizontal portion 261 and a second inclined portion 262 connected to the second horizontal portion 261, wherein a second included angle B is formed between the second horizontal portion 261 and the second inclined portion 262. In an embodiment, it should be noted that the range of the second included angle B may be 125 degrees to 145 degrees. After one end of the upper panel of the second aluminum honeycomb panel 32 is lapped on the second horizontal portion 261, a second groove 263 is provided between a side end surface of the upper panel towards the second inclined portion 262 and the second inclined portion 262. The included angle b at the second groove 263 is 35 degrees to 55 degrees.

In another preferred embodiment of the present application, a first fillet welding position 221 is provided at a portion of the first shoulder 22 in contact with a lower panel of the first aluminum honeycomb panel 31.

A second fillet welding position 231 is provided at a portion of the second shoulder 23 in contact with a lower panel of the second aluminum honeycomb panel 32. The lower panel of the first aluminum honeycomb panel 31 is lapped on the first fillet welding position 221 of the first shoulder 22 and is welded to the first shoulder 22 as a whole by fillet welding. Meanwhile, the lower panel of the second aluminum honeycomb panel 32 is lapped on the second fillet welding position 231 of the second shoulder 23 and is welded to the second shoulder 23 as a whole by fillet welding.

It should be noted that, the connection strength between the first shoulder 22 and the first aluminum honeycomb panel 31 can be effectively enhanced by fillet welding, meanwhile, the connection strength between the second shoulder 23 and the second aluminum honeycomb panel 32 can be effectively enhanced, so that the first aluminum honeycomb panel 31 and the second aluminum honeycomb panel 32 can be firmly connected to the roof connecting beam 2.

Figure 2:
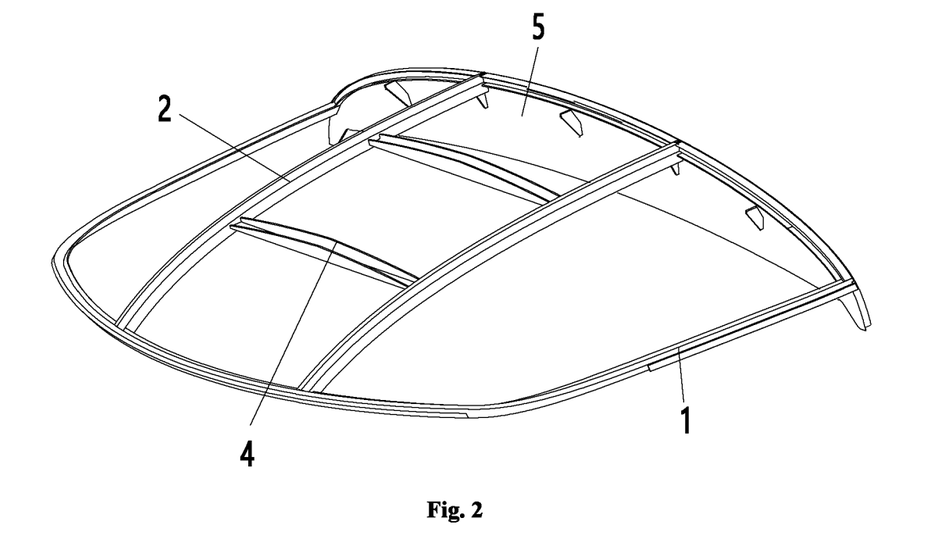
FIG. 2 is a connection structure diagram of a roof carline, a roof connecting beam, a reinforcing beam and a roof rear end panel in FIG. 1.

As shown in FIGS. 1 and 2, in a preferred embodiment of the present disclosure, the roof connecting beams 2 are multiple, and each of the roof connecting beams 2 is arranged at intervals. It should be noted that if more than two aluminum honeycomb panels 3 need to be added, the number of roof connecting beams 2 needs to be increased accordingly to fixedly connect adjacent aluminum honeycomb panels 3. That is, in the present disclosure, once one roof connecting beam 2 is adopted, one aluminum honeycomb plate 3 needs to be installed correspondingly on its left and right sides, respectively.

The so-called "left side" and "right side" are both described based on the current perspective shown in FIGS. 1 and 2.

As shown in FIGS. 1 and 2, in a preferred embodiment of the present disclosure, the cab roof structure further includes reinforcing beams 4 respectively disposed between two adjacent roof connecting beams 2, and the reinforcing beams 4 are multiple and disposed at intervals along an extending directions of the roof connecting beams 2. It should be noted that when the roof connecting beam 2 is regarded as a longitudinal beam, the reinforcing beam 4 can be understood as a transverse beam arranged between two adjacent longitudinal beams. The transverse beam is provided for further enhancing the structural strength and load-bearing capacity of the roof carline 1 as well as the roof connecting beam 2, and further, to increase the structural strength and load-bearing capacity of the cab roof.

It should be noted that the reinforcing beam 4 can also be a hollow profile to reduce the weight of the cab roof.

Figure 5:
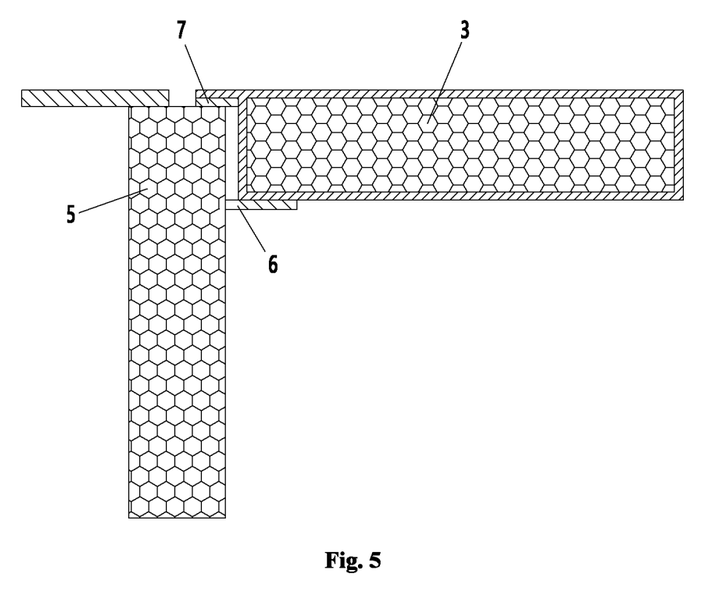
FIG. 5 is a connection structure diagram of the roof rear end panel connected to the first aluminum honeycomb panel or the second aluminum honeycomb panel in FIG. 1.

As shown in FIGS. 1, 2 and 5, in a preferred embodiment of the present disclosure, the cab roof structure further includes a roof rear end panel 5 disposed at a rear end of the roof carline 1, wherein a first end of the roof connecting beam 2 is connected to the roof carline 1, and a second end of the roof connecting beam 2 is connected to the roof rear end panel 5. Specifically, the roof connecting beam 2 can be respectively connected to the roof carline 1 and the roof rear end panel 5 by welding as a whole.

In an embodiment, the roof rear end panel 5 may be an aluminum honeycomb panel, so that the overall weight of the cab roof structure can be effectively reduced while ensuring the structural strength.

As shown in FIG. 5, in a preferred embodiment, a support member 6 extending in a direction away from the roof rear end panel 5 is provided on a surface of the roof rear end panel 5 towards a head. It should be noted that, due to the support member 6, the force distribution is effectively improved to increase the load-bearing capacity, and thus the support member 6 can play a better supporting role for the aluminum honeycomb panel 3.

In a specific embodiment, the support member 6 includes a support plate, a support rib or a support column. It should be noted that the support plate, support rib or support column can be fixedly installed on one side of the roof rear end panel 5 by welding.

As shown in FIG. 5, in a preferred embodiment of the present disclosure, it is schematically illustrated in the figure that a horizontal mounting position is provided on an upper end surface of the roof rear end panel 5, and an aluminum liner panel 7 is disposed on the horizontal mounting position. It should be noted that, due to the aluminum liner panel 7, the thickness of the upper panel of the aluminum honeycomb panel 3 can be increased, and the structural and connection strength can be enhanced.

Further, due to the addition of the aluminum liner panel 7, the difference in thickness between the upper panel of the aluminum honeycomb panel 3 and the top wall of the vehicle body can be compensated, so as to smoothly connect the roof rear end panel 5, the top wall of the vehicle body and the upper end surface of the upper panel of the aluminum honeycomb panel 3.

In another preferred embodiment of this disclosure, upper panels of each of the aluminum honeycomb panels 3 proximate to the roof rear end panel 5 are welded to an upper end surface of the aluminum liner panel 7. Specifically, since the support member 6 and the lower surface of the aluminum honeycomb panel 3 are in contact with each other, the contact area between each other is increased, and thus, the aluminum honeycomb panel 3 can be provided with a better upward supporting force, so that the connection strength between the upper panel of the aluminum honeycomb panel 3 and the upper end surface of the aluminum liner panel 7 can be effectively enhanced, therefore, it is avoided that breakage occurs between the aluminum honeycomb panel 3 and the upper end surface of the aluminum liner panel 7 due to its own gravity of the aluminum honeycomb panel 3 when there is no force support.

It should be noted that the connecting parts of the roof rear end panel 5 and the aluminum honeycomb panel 3 are connected as a whole by plug welding, so that the roof rear end panel 5 and the aluminum honeycomb panel 3 can be smoothly connected and thus the cab roof has better manufacturability.

According to a second aspect of the present disclosure, it is further provided a cab including the cab roof structure mentioned above.

According to a third aspect of the present disclosure, it is further provided a rail train including the cab mentioned above.

In summary, due to the high structural strength and excellent rigidity of the aluminum honeycomb panels 3, applying the aluminum honeycomb panels 3 to the cab roof can help reduce the number of plates and beams to some extent, such that the weight of the cab roof is reduced, and thus the cab roof has the advantages of light weight and good manufacturability.

In addition, due to the addition of aluminum honeycomb panels 3, the structural strength of the cab roof is effectively enhanced, thus the number of plates and beams can be appropriately decreased. With the decrease in the number of plates and beams, the welding amounts are greatly reduced, thereby effectively simplifying the manufacturing difficulty, reducing the complexity of the manufacturing process, and improving the production efficiency of the cab roof.

The descriptions above are only preferred embodiments of the present disclosure and are not intended to limit the present disclosure. Any modification, equivalent substitution or improvement made within spirits and principles of the present disclosure should be included within the protection scope of the present disclosure.

The invention claimed is:

1. A cab roof structure comprising:
a roof carline;
at least two aluminum honeycomb panels; and
at least one roof connecting beam disposed on the roof carline, comprising a roof connecting beam between every two aluminum honeycomb panels,
wherein each aluminum honeycomb panel of every two aluminum honeycomb panels is fixedly connected to a left or right side of the roof connecting beam;
wherein the at least two aluminum honeycomb panels comprise:
a first aluminum honeycomb panel disposed on a left side of the roof connecting beam; and
a second aluminum honeycomb panel disposed on a right side of the roof connecting beam,
wherein the roof connecting beam comprises:
a first protrusion provided on an upper surface of the roof connecting beam;
a second protrusion provided on an upper end surface of the first protrusion; and
a first shoulder configured to connect an upper panel of the first aluminum honeycomb panel and a second shoulder configured to connect an upper panel of the second aluminum honeycomb panel, the first and second shoulders respectively provided on left and right sides of the second protrusion and wherein bottom surfaces of bottom panels of the first and second aluminum honeycomb panels are disposed on the upper surface of the roof connecting beam.

2. The cab roof structure of claim 1, wherein the roof connecting beam further comprises a third shoulder configured to bear the first aluminum honeycomb panel and a fourth shoulder configured to bear the second aluminum honeycomb panel, the third and fourth shoulders are respectively provided on left and right sides of the first protrusion.

3. The cab roof structure of claim 2, wherein an upper end surface of the third shoulder is flush with an upper end surface of the fourth shoulder.

4. The cab roof structure of claim 1, wherein an upper end surface of the first shoulder is flush with an upper end surface of the second shoulder.

5. The cab roof structure of claim 1, wherein one end of the upper panel of the first aluminum honeycomb panel is welded onto the first shoulder at a first welding position on the first shoulder.

6. The cab roof structure of claim 5, wherein the first shoulder comprises a first horizontal portion and a first inclined portion connected to the first horizontal portion, wherein a first included angle is formed between the first horizontal portion and the first inclined portion.

7. The cab roof structure of claim 6, wherein the first horizontal portion is disposed above a third shoulder on either left or right side of the first protrusion, and
wherein the first horizontal portion is located on a horizontal plane disposed in parallel with the upper end surface of the third shoulder.

8. The cab roof structure of claim 1, wherein one end of the upper panel of the second aluminum honeycomb panel is welded onto the second shoulder at a second welding position on the second shoulder.

9. The cab roof structure of claim 8, wherein the second shoulder comprises a second horizontal portion and a second inclined portion connected to the second horizontal portion, wherein a second included angle is formed between the second horizontal portion and the second inclined portion.

10. The cab roof structure of claim 2, wherein the third shoulder is in contact with a lower portion of the first aluminum honeycomb panel at a first fillet welding position at a portion of the third shoulder, and
wherein the fourth shoulder is in contact with a lower portion of the second aluminum honeycomb panel at a second fillet welding position at a portion of the fourth shoulder.

11. The cab roof structure of claim 1, further comprising a plurality of reinforcing beams respectively disposed between two adjacent roof connecting beams, and
wherein the plurality of reinforcing beams are disposed at intervals along an extending direction of the roof connecting beams.

12. The cab roof structure of claim 1, further comprising a roof rear end panel disposed at a rear end of the roof carline, wherein a first end of the roof connecting beam is connected to the roof carline, and a second end of the roof connecting beam is connected to the roof rear end panel.

13. The cab roof structure of claim 12, further comprising a support member provided on a surface of the roof rear end panel towards a head, the support member extending in a direction away from the roof rear end panel.

14. The cab roof structure of claim 12, wherein a horizontal mounting position is provided on an upper end surface of the roof rear end panel, and an aluminum liner panel is disposed on the horizontal mounting position.

15. The cab roof structure of claim 14, wherein an upper panel of each of the aluminum honeycomb panels proximate to the roof rear end panel is welded to an upper end surface of the aluminum liner panel.

16. A cab, comprising the cab roof structure of claim 1.

17. A rail train, comprising the cab of claim 16.

18. The cab roof structure of claim 4, wherein one end of the upper panel of the first aluminum honeycomb panel is welded onto the first shoulder at a first welding position on the first shoulder.

19. The cab roof structure of claim 4, wherein one end of the upper panel of the second aluminum honeycomb panel is welded onto the second shoulder at a second welding position on the second shoulder.

\* \* \* \* \*